July 20, 1943.  J. R. CAMPBELL  2,324,821

MEASURING AND CONTROL METHOD AND APPARATUS

Filed Feb. 8, 1939

Inventor
JAMES R. CAMPBELL
By Raymond D. Jenkins
Attorney

Patented July 20, 1943

2,324,821

UNITED STATES PATENT OFFICE 2,324,821

MEASURING AND CONTROL METHOD AND APPARATUS

James R. Campbell, Glendora, Calif., assignor to General Electric Company, a corporation of New York Application February 8, 1939, Serial No. 255,301

18 Claims. (Cl. 236—15)

This invention relates to a method and apparatus for measuring and/or controlling the condition of an atmosphere. More particularly my invention relates to a method and apparatus for measuring and/or controlling the ratio between the rate of fuel flow and air flow to a furnace to maintain a desired furnace atmosphere therein, or to maintain optimum combustion efficiency.

In the present state of the art industrial furnace atmospheres are divided for convenience into four typical conditions; (1) neutral; (2) oxidizing; (3) reducing; (4) special. Neutral atmospheres are those in which there is practically no free oxygen. Oxidizing atmospheres are those in which there is an appreciable amount of free oxygen present. Reducing atmospheres are those in which there is an element present having an unsatisfied affinity for oxygen. Special atmospheres may be defined as those in which there is introduced a gas or vapor for some particular purpose.

In industrial furnaces it is not only of importance to know the qualitative condition of the furnace atmosphere, but it is also of vital importance to know the quantitative condition. Thus certain operations require strongly oxidizing atmospheres. Typical examples of such operations are core baking and vitreous enameling. On the other hand, in the treatment of certain metals to prevent scale formation a finely reducing atmosphere may produce the best results. In the annealing of brass it has been found desirable under certain circumstances to introduce methanol vapor into the furnace. In furnaces where combustion efficiency is the prime factor it is, of course, desirable to maintain a fuel-air ratio which will produce a furnace atmosphere having a predetermined oxygen content. To increase the oxygen content above this predetermined amount results in a decrease in combustion efficiency, and likewise to decrease the oxygen content results in a decrease in efficiency, due for example to incomplete combustion.

One object of my invention is to provide a method and apparatus for detecting or determining the condition of the furnace atmosphere not only from a qualitative but from a quantitative standpoint as well.

A further object of my invention is to provide a method and apparatus for regulating the rate of admission of an oxidizing or reducing agent to maintain the atmosphere within a furnace at a predetermined or desired condition.

Still another object is to provide a method and apparatus for determining the ratio between the rate of air flow and fuel flow to a furnace.

A further object of my invention is to provide a method and apparatus for regulating the fuel-air ratio to maintain the atmosphere within a furnace at a predetermined condition.

A still further object is to provide a method and apparatus for determining the oxygen content in the gases resulting from combustion, and to regulate the fuel-air ratio to maintain such oxygen content at a desired optimum value.

Further objects will be apparent from the description to follow and the drawing, in which.

Figure 1:
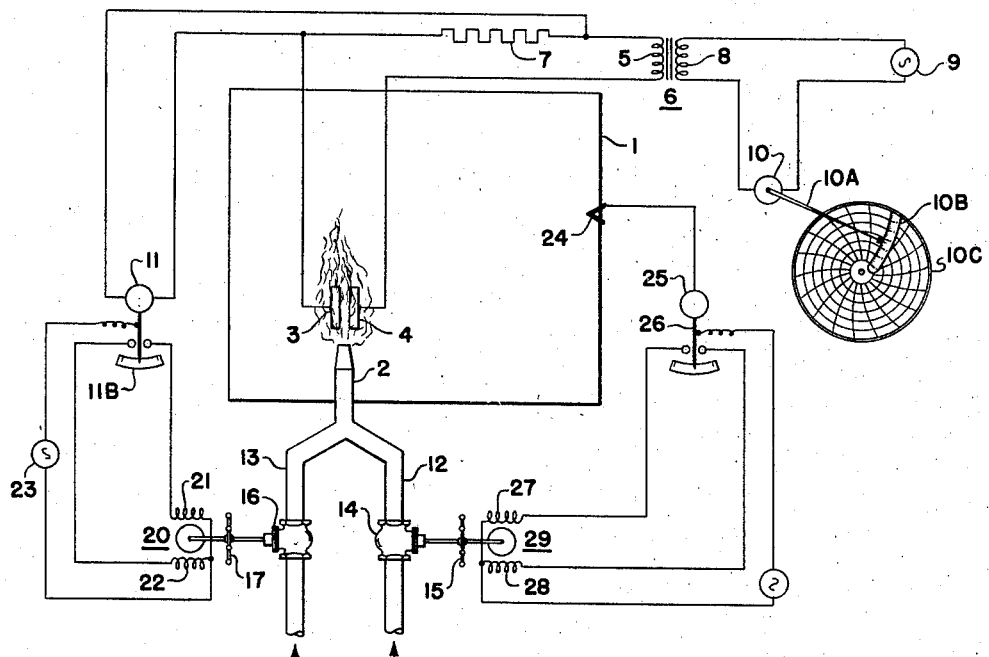
Fig. 1 illustrates somewhat diagrammatically one embodiment of my invention.

Referring now to Fig. 1, I have therein diagrammatically indicated at 1 a furnace to which fuel and air are introduced through a burner 2. The furnace 1 may be taken as representative of any industrial furnace used, for example, in the heat treatment of metals or for use with a vapor generator. It will be evident as the description proceeds that my invention is not concerned with the particular use to which the furnace may be put, but as a matter of fact it may be used to determine quantitatively the condition or composition of any atmosphere.

I have found that when a fuel is burned the conductivity of the flame produced by such burning is a measure of the fuel-oxygen ratio or fuel-air ratio as it is usually called. If the fuel is burned in a furnace, it is apparent, that as the composition of the furnace atmosphere is a function of the fuel-air ratio it is therefore also a function of the conductivity of the flame. Therefore, by determining the conductivity of a flame I provide a means for readily determining the fuel-air ratio and/or the condition or composition of the furnace atmosphere. Assuming, as an example, that the fuel-air ratio is such as to give perfect combustion, as the ratio is increased or decreased, thereby causing a deficiency or excess of air (reducing and oxidizing atmosphere respectively), the electrical conductivity of the flame will vary in functional relation to such increase or decrease. In accordance with my invention, I provide means for determining the electrical conductivity of the flame, and thus obtain a measure of the fuel-air ratio. I may further provide means for controlling one or both of the elements of combustion to maintain a predetermined desired fuel-air ratio.

Within the furnace 1 I show two spaced electrodes 3 and 4 separate from the burner 2 and connected in circuit with the secondary 5 of a transformer 6 and a resistance 7. The primary 8 of the transformer 6 is connected in circuit with a suitable source of potential indicated at 9 and a current measuring device such as an ammeter 10. The electrodes 3 and 4 are preferably located so that when the furnace is in operation, that is flame is issuing from the unconfined burner 2, the space between the electrodes is filled with flame. As the conductivity of the flame between the electrodes 3 and 4 changes, due to a change in fuel-air ratio, the impedance of the secondary of the transformer 5 will likewise change, thereby causing a greater or lesser current flow through the primary winding 8 as well as the secondary winding. Hence the current flow in the primary winding becomes a measure of the conductivity of the flame between the electrodes 3 and 4 and inferentially a measure of the fuel-air ratio or of the composition of the furnace atmosphere.

I have shown the ammeter 10 as provided with an index 10A arranged to visually exhibit by means of a scale 10B and a time revoluble chart 10C the magnitude of the current flow in the primary circuit of the transformer 6. As this current flow corresponds to the flame conductivity and hence to the fuel-air ratio, or composition of the furnace atmosphere, the scale 10B and chart 10C may be graduated in units descriptive of such factors, such as for example, "percent total air," "fuel-air ratio," "percent oxidizing" or "percent reducing." The index 10A, scale 10B and chart 10C are merely specific forms of exhibiting means which may take a wide variety of other forms as will be evident to those skilled in the art.

If desired I may also utilize the potential drop across the resistance 7 as a measure of the conductivity of the flame between the electrodes 3 and 4. Thus in Fig. 1 I show a volt meter 11 electrically connected across the resistance 7 so that its deflections will correspond to the potential drop thereacross and accordingly to the flame conductivity between the electrodes 3 and 4. The volt meter 11 is shown as provided with a cooperating scale 11B which, as explained with reference to the scale 10B, may be graduated in units indicative of the fuel-air ratio, or composition of the furnace atmosphere.

As hereinbefore explained, it is usually desired to maintain a predetermined fuel-air ratio so that the atmosphere within the furnace will have a predetermined composition. The particular composition which will produce optimum results depends upon the use to which the furnace is put. It is therefore usually desirable to regulate one or more of the agents producing the furnace atmosphere to maintain the composition thereof at a predetermined value which will yield optimum results. Such regulation may be effected either manually or automatically. Thus in Fig. 1 I show the burner 2 provided with fuel through a conduit 12 and air through a conduit 13. In the conduit 12 is a regulating valve 14 provided with a hand wheel 15, and in the conduit 13 is a similar regulating valve 16 provided with a hand wheel 17. An operator by observing the indications of the devices 10 and/or 11 may by proper actuation of the hand wheels 15 and 17 regulate the fuel-air ratio to maintain a predetermined desired composition of the atmosphere within the furnace 1.

In the embodiment of my invention shown in Fig. 1 the fuel-air ratio may be automatically controlled to maintain a predetermined flame conductivity resulting in the maintenance of a desired composition of the furnace atmosphere. This control may be effected by having the devices 10 or 11 regulate the rate of flow of either the fuel or air. As it is usually preferable to regulate the rate of fuel flow in accordance with the heat requirements, I show in Fig. 1 the device 11 arranged to position the air regulating valve 16 to maintain a desired ratio between fuel flow and air flow. As shown, arranged to position the valve 16 is a motor 20 having opposed windings 21 and 22. Windings 21 and 22 are connected through a suitable source of potential indicated at 23 to the deflecting member of the device 11. It will be evident from an inspection of the drawing that upon movement of the deflecting member 11 in one direction the winding 22 will be energized, whereas movement in the opposite direction will effect energization of the winding 21. By suitable adjustment, as will be readily understood by those familiar with the art, the deflecting member of device 11 may be caused to assume the position shown when the conductivity of the flame indicates that the fuel-air ratio is at the desired value. Upon a change in the fuel-air ratio, the deflecting member 11 by virtue of the consequent change in flame conductivity will move to energize one or the other of the windings 21 or 22 to position the valve 16 in proper direction to restore the desired fuel-air ratio. Upon the fuel-air ratio returning to the desired value the deflecting member of the device 11 will again assume the position shown.

The fuel admitted to the furnace 1 may be controlled to maintain the atmosphere therein at a desired temperature and in Fig. 1 I have diagrammatically illustrated such a control. Suitably located in the furnace 1 is a thermocouple 24 connected to a responsive device, such as a millivolt meter 25, having a deflecting member 26. The deflecting member 26 is shown in the position assumed when the temperature within the furnace 1 is at the desired value. Upon a change in temperature the member 26 will deflect in one direction or the other, thereby causing energization of either winding 27 or 28 of a motor 29 arranged to position the valve 14. Such positioning of the valve will result in a corresponding change in rate of fuel flow to the furnace 1, thereby causing a change in temperature in desired sense to restore it to the desired value.

My invention may be further utilized to determine the oxygen content of a gas by burning a sample of the gas in a pilot flame and determining the conductivity of the flame as a measure of the fuel-oxygen ratio. If the gas and fuel are supplied the pilot burner at constant rates, it is evident that any variation in the fuel-oxygen ratio will be due to a change in the oxygen content of the gas.

Figure 2:
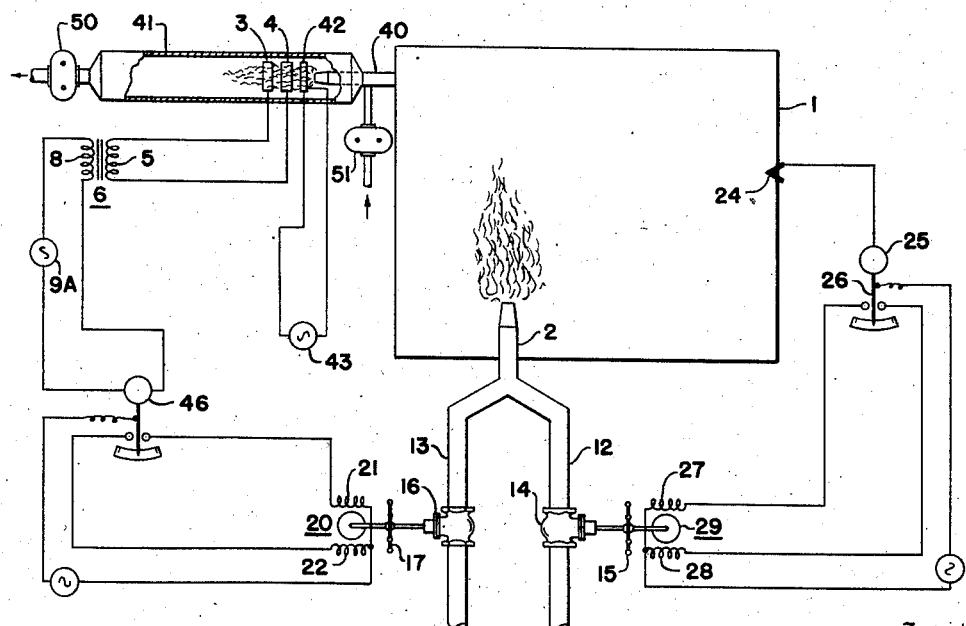
Fig. 2 illustrates diagrammatically another embodiment of my invention.

In Fig. 2 I have shown such a modification of my invention arranged to determine the oxygen content of the gases resulting from combustion of fuel and air in the furnace 1. The apparatus I have shown may also be arranged to control the flow of air and/or fuel to the furnace 1 to maintain a predetermined oxygen content of the flue gases.

Referring to Fig. 2, I therein show a sampling tube 40 through which a continuous sample of the flue gases, that is the gases resulting from combustion in the furnace 1, is drawn at a constant rate by means of a suitable metering pump

50. The tube 40 has an enlarged section 41 forming a combustion tube wherein the gas may be used to support the combustion of a suitable fuel, such as methanol vapor or methyl alcohol vapor admitted to the combustion tube at a constant rate through a metering pump 51. The conductivity of the flame will be a measure of the fuel-oxygen ratio, and as the rate of fuel supply is maintained constant the conductivity of the flame will accordingly become a measure of the oxygen content of the flue gas. As shown, the electrodes 3 and 4 may be disposed in the flame, and apparatus, such as a current measuring device 46, connected in the primary of the transformer 6 used to give a visual indication of the oxygen content of the flue gas.

As the oxygen content of the flue gas may vary between wide limits, to facilitate the ignition of the fuel I may provide a suitable heating element, such as indicated at 42, comprising a resistance energized from a source of current indicated at 43.

As described with reference to Fig. 1, the modification of my invention shown in Fig. 2 may also be provided with suitable means for automatically regulating the fuel-air ratio to the burner 2. Therein I show the measuring device 46 arranged to vary the rate of air supply in accordance with changes in the oxygen content in the flue gas. Likewise the rate of fuel supply to the furnace 1 may be controlled from temperature to maintain a predetermined desired temperature within the furnace 1.

The foregoing description serves merely to illustrate, by specific applications, the principles of my invention and should not be taken as defining the scope thereof.

What I claim as new, and desire to secure by Letters Patent of the United States, is:

1. The method of determining the ratio between the elements of combustion supplied a furnace flame in variable ratios which includes determining the electrical conductivity of the flame within the furnace resulting from the combustion of the elements of combustion and utilizing such determination as a measure of the ratio between the elements of combustion.

2. The method of determining the composition of a furnace atmosphere in which fuel and air are burned which includes determining the ratio between fuel and air supplied by measuring the electrical conductivity of the flame resulting from the combustion of the fuel and air.

3. The method of determining the oxygen content of a gas which includes burning a fuel with the gas and determining the electrical conductivity of the flame produced by such burning as a measure of the oxygen content in the gas.

4. The method of determining the oxygen content of a gas which includes burning methanol with the gas and determining the electrical conductivity of the flame produced by such burning as a measure of the oxygen content in the gas.

5. The method of determining the oxygen content of a gas which includes burning methyl alcohol with the gas and determining the electrical conductivity of the flame produced by such burning as a measure of the oxygen content of the gas.

6. The method of determining the oxygen content of a gas which includes supplying fuel and the gas to a burner at constant rates, burning the mixture of fuel and gas, and using the electrical conductivity of the flame produced by such burning as a measure of the oxygen content in the gas.

7. The method of determining the composition of a furnace atmosphere produced by the burning of the elements of combustion which includes determining the electrical conductivity of the flame produced by such burning as a measure of the ratio between the elements of combustion.

8. The method of maintaining a desired fuel-air ratio to a furnace which includes, varying the fuel-air ratio in correspondence with changes in the electrical conductivity of the flame produced by the burning of the fuel and air.

9. The method of maintaining a desired oxygen content in the gases of combustion produced by the burning of the elements of combustion in a furnace which includes, burning a fuel with the gases of combustion, determining the electrical conductivity of the flame produced by such burning and varying the ratio between the elements of combustion supplied the furnace in correspondence with changes in the electrical conductivity of said flame.

10. Apparatus comprising an unconfined burner, means for supplying the elements of combustion to the burner in variable ratios, and means to determine the ratio between the elements of combustion supplied the burner comprising means including spaced electrodes separate from the burner to determine the electrical conductivity of the flame issuing from the burner and produced by the burning of the elements of combustion.

11. Apparatus comprising a burner, means for supplying fuel and air to the burner, means to determine the ratio between fuel and air supplied the burner comprising a pair of spaced electrodes disposed to be enveloped in the flame issuing from said burner, an electric circuit including said electrodes, and means for determining the electrical conductivity of said circuit as a measure of the ratio between fuel and air supplied the burner.

12. Apparatus comprising an unconfined burner, means for supplying fuel and oxygen to the burner in variable ratios, means to determine the ratio between the fuel and oxygen supplied the burner comprising an electric circuit including spaced electrodes separate from the burner and a portion of the flame produced by the burning of the fuel and oxygen, and means to determine the electrical conductivity of said circuit.

13. Apparatus comprising an unconfined burner, means for supplying the elements of combustion to the burner in variable ratios, means to determine the ratio between the elements of combustion comprising an electric circuit including spaced electrodes separate from the burner and a portion of the flame produced by the burning of the elements of combustion, and means to determine the electrical conductivity of said circuit.

14. In combination, a furnace, means for supplying the furnace with the elements of combustion, means for determining the electrical conductivity of the flame produced by the combustion of the elements of combustion, and means for controlling the ratio between the elements of combustion supplied the furnace in correspondence with the electrical conductivity of the flame.

15. In combination, a furnace, means for supplying the furnace with the elements of combustion, means for determining the electrical conductivity of the flame produced by the combustion of the elements of combustion, means for controlling the ratio between the elements of combustion supplied the furnace in correspondence with the electrical conductivity of the flame, and means for modifying said ratio in accordance with the temperature in the furnace.

16. In combination, means for determining the oxygen content of a gas comprising, a burner, means supplying the gas to said burner at a relatively uniform flow rate, means supplying a fuel to said burner at a relatively uniform flow rate, and means for determining the electrical conductivity of the flame produced by the burning of said gas and fuel as a measure of the oxygen content of the gas.

17. The method of determining the completeness of combustion which includes, determining the electrical conductivity of the flame produced by such combustion, and utilizing the determination as a measure of the completeness of combustion.

18. A combustion quality control system for a fuel burner including fuel and air supply means to establish a flame at said burner, a device to control the mixture of fuel and air supplied to said burner, a pair of spaced electrodes insulated from each other and positioned in the path of said burner flame, a source of electrical energy, a device to operate said control device, a circuit connecting said source of energy and said second mentioned device, and means controlled by the conductance between said electrodes to control the conductivity of such circuit.

JAMES R. CAMPBELL.